United States Patent
Beard

[15] 3,658,214
[45] Apr. 25, 1972

[54] METERING VALVE FOR FLUID DISPENSER

[72] Inventor: Walter C. Beard, South Street, Middlebury, Conn. 06762

[22] Filed: May 1, 1970

[21] Appl. No.: 33,781

[52] U.S. Cl. ...................................................222/402.2
[51] Int. Cl. .......................................................B65d 83/00
[58] Field of Search ...........................222/394, 402.2, 402.24

[56] References Cited

UNITED STATES PATENTS

| | | | |
|---|---|---|---|
| 2,788,925 | 4/1957 | Ward | 222/402.2 |
| 3,130,880 | 4/1964 | Briechle | 222/402.2 |
| 2,701,163 | 2/1955 | Teller et al. | 222/402.2 |
| 3,158,179 | 11/1964 | Lehmann | 222/402.2 X |
| 3,240,430 | 3/1966 | Diamond | 222/402.2 X |
| 3,269,615 | 8/1966 | Ferry, Jr. | 222/402.2 |

*Primary Examiner*—Samuel F. Coleman
*Attorney*—Delio and Montgomery

[57] ABSTRACT

Metering valve assembly for dispensing fluid products wherein a movable valve stem, communicating with a discharge orifice, and having a lower inlet chamber (female member) which, when the valve stem is depressed, slides over a fixed tubular projection (male member) communicating with the reservoir of the container, thereby discharging the contents of a metering chamber. When the valve stem is released, a spring urges it upwardly such that an outlet orifice in the valve stem moves out of the metering chamber, thereby closing the valve stem to entry of contents from the metering chamber. Simultaneously, an orifice of the tubular projection is opened to permit filling of the metering chamber.

11 Claims, 12 Drawing Figures

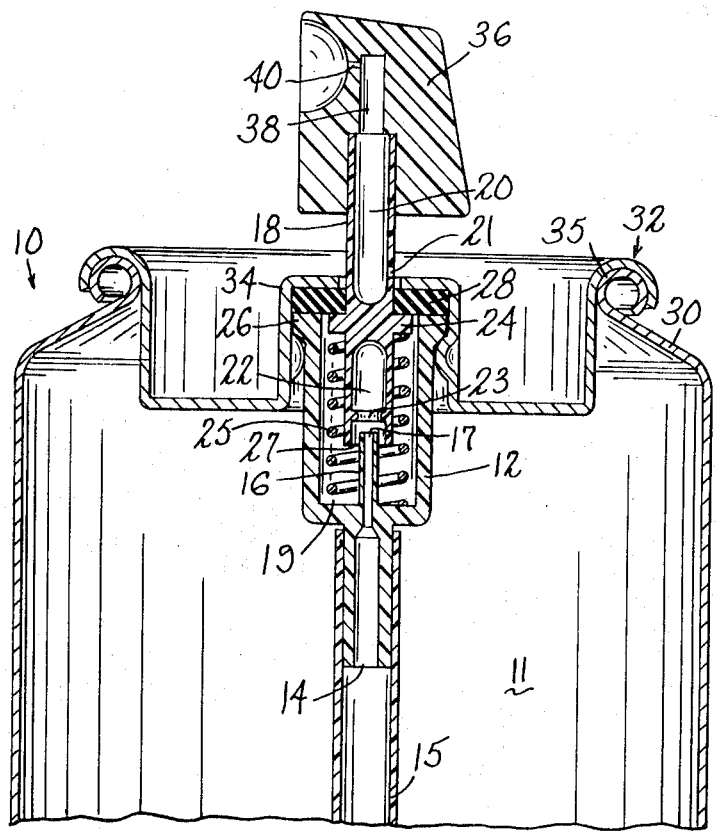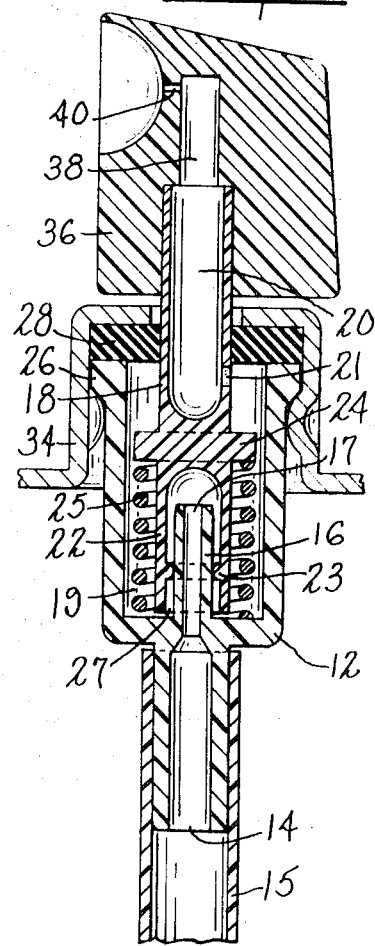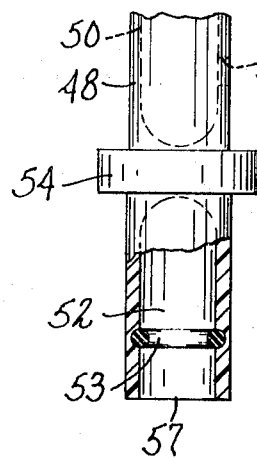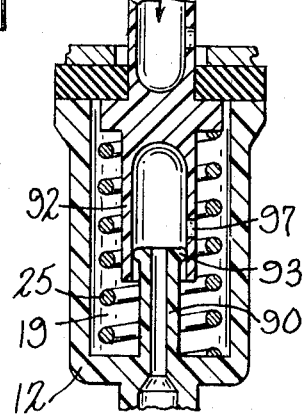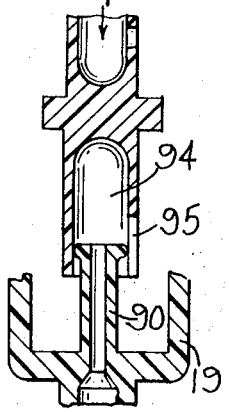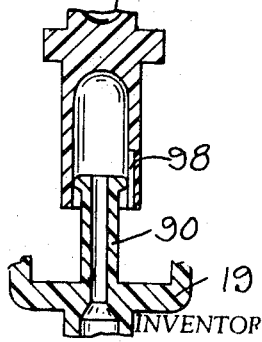
INVENTOR
Walter C. Beard
BY De Lio and Montgomery
ATTORNEYS

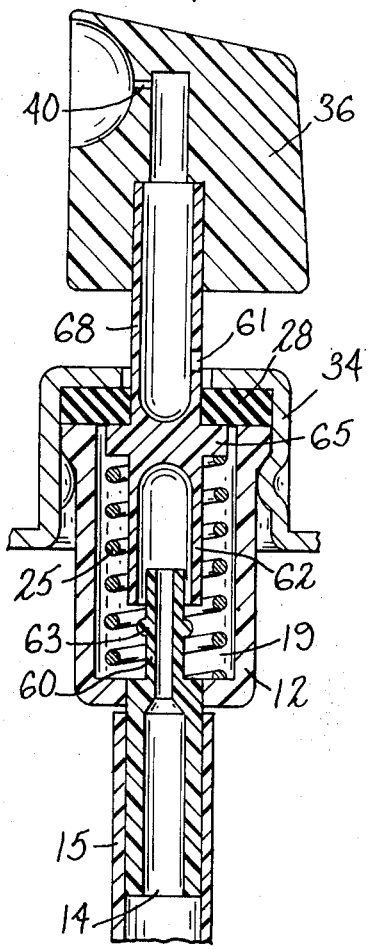
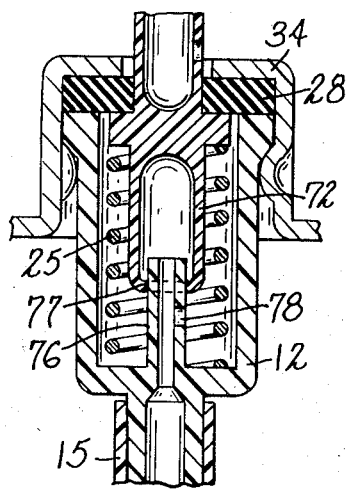
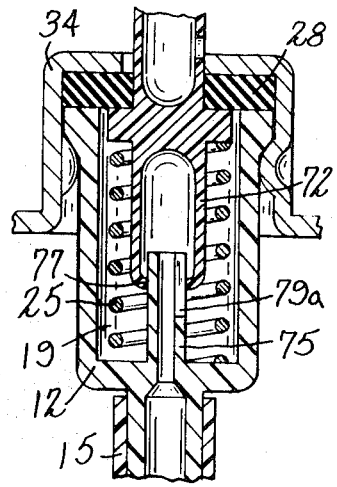
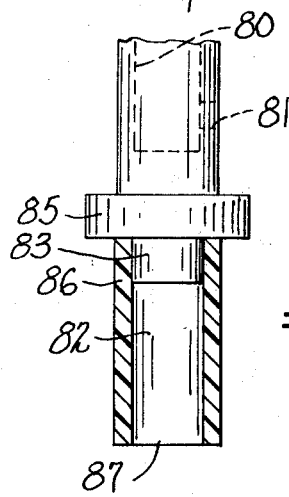
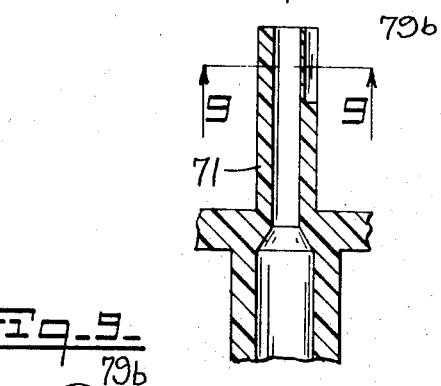
INVENTOR
Walter C. Beard 3,658,214

1

METERING VALVE FOR FLUID DISPENSER

BACKGROUND OF THE INVENTION

This invention relates to metering valves and more particularly to metering valves for dispensing fluid products such as cosmetics, pharmaceuticals, foods, detergents, and paints.

With the advent of new plastics, manufacturers of metering valves, especially for use with the popular aerosol-type products, have turned to such plastics because of ease of fabrication of parts therefrom. Nevertheless, plastics tend to "creep" or undergo other dimensional changes, 1) under changing conditions of temperature, 2) contact with other parts whether plastic or metal, and 3) contact with the fluids being dispensed, so as to reduce the useful life of the product. For example, such dimensional changes cause passages in the valve to clog or cause variance in the metering quantity of the product. The latter is a significant factor because precise metering action is often critical in dispensing certain products, such as foods and pharmaceuticals.

Where effective compromise has been sought by combining plastic with metals, the compromise has required the use of elastomeric gaskets, such as O-rings and the like. This approach is nevertheless subject to the disadvantage that elastomeric materials tend to harden, crack, dissolve or to undergo chemical and physical changes due to temperature variations during use or storage, and due to contact with the fluids being dispensed. In addition, great care must be exercised in the handling and assembly of the gasket material, adding substantially to the difficulty and expense of manufacture of metering valves utilizing such materials.

In view of these and other problems encountered in the design of metering valves, it has long been believed that the solution must be in some seemingly elementary feature of structure rather than primarily in selection of materials of construction.

SUMMARY OF THE INVENTION

A primary feature of the present invention is the combination of a fixed tubular projection (male member) communicating with the reservoir of a fluid dispensing container, and a movable valve stem having a lower inlet chamber (female member) which slidably moves over the tubular projection when the actuator of the valve is depressed. By contrast, the known prior art utilizes a moving male member which slidably engages a fixed female member.

An object of the present invention, therefore, is to provide a new and improved metering valve assembly for dispensing fluid products which is simple in design and easy and economical to fabricate.

A further object is to provide a new and improved metering valve which may be fabricated from a variety of materials, including metals, plastics, or plastics in combination with metals, or any of the foregoing with elastomeric materials, without the difficulties normally encountered in the use of plastics.

A still further object is to provide a new and improved metering valve having more positive sealing action when filling or emptying the metering chamber whereby the product is dispensed with accuracy and precision and without clogging.

These and other objects, features, and advantages will in part be obvious and will become apparent from the following description.

The invention accordingly comprises the features of construction, combination of elements, and arrangement of parts which will be exemplified in the construction hereinafter set forth, and the scope of the invention will be indicated in the claims.

DETAILED DESCRIPTION

For a fuller understanding of the invention, reference is had to the following description taken in connection with the accompanying drawings, in which:

FIG. 1 is a fragmentary sectional view through a dispenser incorporating a metering valve assembly according to a preferred embodiment of the invention;

FIG. 2 is a sectional view of a portion of the assembly of FIG. 1 showing the valve assembly in a discharge position;

FIG. 3 is a partial sectional view of a modified form of the valve stem shown in FIG. 1;

FIG. 4 is a fragmentary sectional view of a modified form of the metering valve assembly, showing the valve in filling position; FIG. 5 is a fragmentary sectional view of a portion of yet another form of the metering valve assembly with the valve in filling position;

FIG. 6 is a fragmentary sectional view similar to FIG. 5 showing a modification of the orifice of the tubular projection in the valve assembly;

FIG. 7 is a partial sectional view of yet another form of the valve stem shown in FIG. 1;

FIG. 8 is a sectional view of the tubular projection shown in FIG. 6;

FIG. 9 is a sectional view taken along line 9—9 of FIG. 8;

FIG. 10 is a fragmentary sectional view of another modification of the tubular projection and the inlet chamber of the metering valve assembly of FIG. 1 with the valve in filling position; and FIGS. 11 and 12 are fragmentary sectional views of modified forms of the tubular projection of FIG. 10.

With respect to FIG. 1, there is shown a dispenser 10 having a valve housing 12 communicating through aperture 14 with a dip tube 15, said dip tube then communicating with the reservoir 11 of the dispenser. Centrally mounted in fixed position of the bottom 13 of housing 12 is a tubular projection or male member 16 having an orifice 17 at its upper end. Slidably mounted partly within the housing 12 above the tubular projection 16 is a tubular valve stem 18 having an upper outlet chamber 20 and a lower inlet chamber or female member 22, the mid-section between the chambers having an abutment 24 integral and unitary therewith. The outlet and inlet chambers of valve stem 18 do not directly communicate but outlet chamber 20 is provided with an outlet orifice 21 and inlet chamber 22 is provided with an inlet orifice 27. It will be noted that inlet chamber 22 is provided with an interior ring 23, integral and unitary with said chamber, having a diameter effective to provide sealing against the exterior walls of tubular projection 16 when the ring is in contact with said tubular projection. A metering chamber 19 is defined by the annular space surrounding inlet chamber 21, tubular projection 16, and the interior walls of valve housing 12. Annular gasket 28 seats on the shoulder 26 of valve housing 12 and is in sliding sealing engagement with abutment or collar 24. Abutment 24, of course, also prevents valve stem 18 from moving entirely out of the housing. The valve assembly of FIG. 1 includes an actuator head 36, passage 38, a discharge orifice 40, and spring means 25 shown urging abutment 24 upwardly in sealing engagement with gasket 28. Also, the valve assembly may be mounted within a cup assembly 32 comprising a central housing 34 which envelops valve housing 12 and which conventionally may be crimped into place to hold said valve housing. The cup assembly 32 is conveniently attached to wall 30 of spray dispenser 10 by bead 35.

In the filling position shown in FIG. 1, the fluid contents of reservoir 11, normally under pressure generated by a compressed gas or liquefied gas therein, is forced through dip tube 15 and tubular projection 16 into metering chamber 19. The filling action continues until the metering chamber is filled or until actuator head 36 is depressed so as to move outlet orifice 21 into the metering chamber. Until depression of the actuator head, abutment 24 is in tight sealing engagement with gasket 28.

FIG. 2 shows the metering valve assembly of FIG. 1 in actuated or discharge position, that is, the position of the valve assembly when actuator head 36 is depressed. With reference to FIG. 2 it will be noted that tubular valve stem 18 slides downwardly through metering chamber 19 such that inlet chamber or female member 22 passes over tubular projection or male member 16. It will also be noted that when outlet orifice 21 moves past annular gasket 28 so as to communicate with metering chamber 19, said outlet orifice permits transport of the contents of the metering chamber into outlet chamber 20 and thence through passage 38 from where it is expressed from discharge orifice 40. Simultaneously, ring 23 moves past orifice 17 of tubular projection 16, thereby sealing or closing orifice 17 to passage of contents therefrom into metering chamber 19. When the pressure actuator head 36 is released, tubular valve stem 18 moves upwardly out of valve housing 12 such that outlet orifice 21 moves out of communication with metering chamber 19. At the same time, metering chamber 19 is opened to receive material from tubular projection 16. This latter relationship of the various parts of the valve assembly, showing filling of metering chamber 19, is shown in FIG. 1.

FIG. 3 shows another embodiment of the abutment and interior ring of valve stem 18 of FIG. 1. With reference to FIG. 3, tubular valve stem 48 again is provided with an outlet chamber 50 having an outlet orifice 51, and an inlet chamber 52 having an inlet orifice 57. However, in this embodiment, the sealing ring 23 of FIG. 1 is replaced by non-unitary annular gasket 53 fabricated of elastomeric material such as natural or synthetic rubber or plastic. Also, abutment 24 of FIG. 1 is in the form of a fixed annular gasket 54, which also may be of an elastomeric material such as natural or synthetic rubber or plastic.

As shown in FIG. 4, an alternative to providing an integral sealing ring 23 on female member 22, as in FIG. 1, is associating the ring with tubular projection or male member 60 as a similar sealing ring 63 integral and unitary therewith. Integral and unitary with valve stem 68 is abutment 65, shown in sealing engagement with gasket 28. When inlet chamber or female member 62 is moved into discharge position from the filling position shown in FIG. 4, ring 63 slidably engages the interior wall of female member 62 to seal it against entry of fluid from metering chamber 19. At the same time, outlet orifice 61 moves past gasket 28 and enters metering chamber 19 to permit transfer of fluid into the outlet chamber.

As shown in FIG. 5, orifice 77 of female member 72 is dimensioned for sliding sealing engagement with tubular projection or male member 76 and an aperture or porthole orifice 78 is positioned on the walls of male member 76 rather than at the upper end as is orifice 17 in FIG. 1. In other respects, the assembly is the same as in FIG. 1. By this modification, sealing rings or gaskets, as shown in the preceding Figures, may be eliminated, thus reducing manufacturing expense.

In the tubular projection 75 of FIG. 6 the porthole orifice 78 of FIG. 5 is replaced by slotted orifice 79a with substantially the same operation and effect as in FIG. 5. In other respects the structure is the same as in FIG. 5.

FIG. 7 is similar to FIG. 3 and illustrates another embodiment of a tubular valve stem which may be used in place of that of FIG. 4. With reference to FIG. 7, valve stem 88 is provided with an outlet chamber 80 and outlet orifice 81 and an inlet chamber 82 and inlet orifice 87. Integral and unitary with the outlet chamber 80 is abutment 85. As in FIG. 3, abutment 85 provides sealing engagement like that of abutment 24 of FIG. 1 or abutment 65 of FIG. 4. However, the wall 86 of inlet chamber 82, although integral, is non-unitary, with the upper portion of the valve stem, and is in the form of a plastic, rubber, or metal sleeve on the extension 83 of the upper portion of the valve stem.

FIG. 8 illustrates another modification of tubular projection in which, in place of the slotted orifice 79a of FIG. 6, there is provided an inapertured slit 79b in the wall of the projection which communicates with the orifice of the projection and requires movement of fluid out of the orifice of the projection and down into the slit before transfer into the metering chamber. This fluid movement is more easily understood from FIG. 9 which is a top cross-sectional view of tubular projection 71 along line 9—9 of FIG. 8. In FIG. 9 it will be noted that slit 79b does not pierce the wall of projection 71 but need only be of a depth sufficient to permit transfer of fluid out of the orifice and down the wall.

The embodiments of the invention represented by FIGS. 4-9 are substantially identical to those of FIGS. 1-3 in operation and effect despite the structural differences. The same is true of the other forms shown in FIGS. 10-12. FIG. 10 is similar to FIG. 4 except that sealing ring 93, corresponding to ring 63 of FIG. 4, while integral and unitary with tubular projection 90, is at the upper end of tubular projection 90, and a porthole inlet orifice 97 of inlet chamber or female member 92 is positioned on a wall of said chamber.

FIG. 11 shows the tubular projection 90 of FIG. 10 but the porthole inlet orifice 97 of FIG. 10 is replaced by a slotted orifice 95 on the wall of inlet chamber 94, or as in FIG. 12, is replaced by an interiorly channelled orifice 98 communicating with the lower end of inlet chamber 96.

From the foregoing it should be apparent that wide variations in the essential structure of the valve assemblies of the invention are possible and practical without substantially changing either the operation or the effect. For example, the relative dimensions of the orifices and chambers may be varied to accommodate desired amounts of metered product as well as different types of product having a desired particle size or fluid viscosity. It should also be evident that the tubular projection of the Figures may be tapered, as seen in FIG. 2. Moreover, although the abutments, gaskets or rings, although shown in the drawings as being integral and/or unitary with various members of the valve assembly, may be separately fabricated and then affixed to the members by known means.

The various parts of the valve assembly may be fabricated of the same or different materials. However, it is preferred that when either of the tubular valve stem or tubular projection is metal, the non-unitary annular gasket 54 of FIG. 3 or gasket 85 of FIG. 7, or the sealing ring 53, as in FIG. 3, be fabricated of a material other than natural or synthetic rubber. However, the the material of gaskets 54 and 85 and ring 53 may be plastic whether the tubular valve stem or tubular projection be metal or plastic. Suitable plastics for construction of the various parts of the valve assembly include nylon, polyolefins such as polyethylene or polypropylene, polyvinylchloride, polystyrene, ABS plastics, acrylics, cellulosics, acetals, fluoroplastics, and the like.

The valve assembly of the invention is useful for dispensing fluid products whether they be present in the reservoir of the dispenser in a single phase or in multiphases and whether the pressure by which the fluid is discharged is generated by a propellant contained in the reservoir or in an external container designed for attachment to the reservoir. Moreover, the fluid may be dispensed as droplets, fine sprays, or as semi-continuous streams, this being determined primarily by the design of the actuator head assembly. The invention is especially convenient and effective in dispensing self-propelled fluid products wherein the propellant is a compressed gas or liquefied halogenated hydrocarbon such as the "Freon" propellants. It will be evident that the present valve assembly provides ease and economy of manufacture with positive sealing of the elements of the valve assembly with the result that quantities of product may be metered easily and with great accuracy.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A metering valve assembly comprising: a valve housing, a tubular stem having an outlet chamber and an inlet chamber not directly communicating, said stem being slidably mounted in said valve housing with its inlet chamber extending into said housing and its outlet chamber extending out of said housing, means engaging said stem and normally urging it outwardly of said housing, an annular gasket mounted on said housing in sealing engagement with said stem, abutment means on said stem, a metering chamber between said stem and the interior walls of said housing, a tubular projection extending from the bottom of said housing, one end of said projection communicating with a reservoir and the other end adapted to fit within the inlet chamber of said stem and to form a sliding seal therewith upon movement of said inlet chamber over said projection, a first orifice in said outlet chamber and a second orifice in said tubular projection whereby when one of said orifices communicates with said metering chamber, the other of said orifices is sealed from communication with said metering chamber.

2. A metering valve assembly according to claim 1 including a ring interior of said inlet chamber, adapted for sliding sealing engagement with said tubular projection.

3. A metering valve assembly according to claim 1 wherein said abutment means is an annular gasket, and including a ring interior of said inlet chamber adapted for sliding engagement with said tubular projection.

4. A metering valve assembly according to claim 1 including a ring on said tubular projection, adapted for sliding sealing engagement with the interior walls of said inlet chamber.

5. A metering valve assembly according to claim 1 including means at the inlet end of said inlet chamber providing sliding sealing engagement with the exterior walls of said tubular projection, the upper end of said tubular projection forming an orifice, said tubular projection also having an aperture in a wall thereof below said orifice.

6. A metering valve assembly according to claim 1 including means at the inlet end of said inlet chamber providing sliding sealing engagement with the interior walls of said tubular projection, the upper end of said tubular projection forming an orifice, said tubular projection also having an apertured slot in a wall thereof communicating with said orifice.

7. A metering valve assembly according to claim 1 wherein said inlet chamber is a sleeve fitting over an extension of said outlet chamber, said extension being closed to communication with said outlet chamber.

8. A metering valve assembly according to claim 1 wherein the upper end of said tubular projection forms an orifice, said tubular projection also having an inapertured slit in a wall thereof communicating with said orifice.

9. A metering valve according to claim 1 including a ring on said tubular projection adapted for sliding sealing engagement with the interior walls of said inlet chamber, and an aperture in the wall of said inlet chamber.

10. The metering valve assembly of claim 9 wherein the aperture in the wall of said inlet chamber is a slot communicating with the inlet end of said inlet chamber.

11. A metering valve assembly according to claim 1 including a ring on said tubular projection adapted for sliding sealing engagement with the interior walls of said inlet chamber, and an inapertured slit on an interior wall of said inlet chamber communicating with the inlet end of said inlet chamber.

* * * * *